United States Patent

Aubry et al.

[15] 3,700,741
[45] Oct. 24, 1972

[54] PROCESS FOR CYCLOPENTADIENE DIMERIZING

[72] Inventors: Jean Aubry; Emile Yax, both of Moselle, France

[73] Assignee: Societe Chimique des Charbonnages Tour Aurore, Courlevoie, France

[22] Filed: June 2, 1971

[21] Appl. No.: 149,326

[30] Foreign Application Priority Data

June 3, 1970 France......................7020437

[52] U.S. Cl. .............................................260/666 A
[51] Int. Cl.................................................C07c 13/14
[58] Field of Search...................................260/666 A

[56] References Cited

UNITED STATES PATENTS

| | | | |
|---|---|---|---|
| 2,211,038 | 8/1940 | Ward | 260/666 A |
| 2,372,237 | 3/1945 | Ward | 260/666 A |
| 2,411,822 | 11/1946 | Doumani | 260/666 A |
| 2,813,135 | 11/1957 | Johnson et al. | 260/666 A |
| 3,196,188 | 7/1965 | Parrish et al. | 260/666 A |

Primary Examiner—James E. Poer
Assistant Examiner—A. P. Demers
Attorney—Karl W. Flocks

[57] ABSTRACT

The invention relates to the improvement in the process of thermally dimerizing a concentrated cyclopentadiene monomer feed said improvement consisting in introducing said feed in a single reactor at atmospheric pressure, heating same to the boiling temperature of said feed, maintaining slight reflux conditions, letting the temperature increase from said boiling temperature to the boiling temperature of substantially pure dicyclopentadiene, stopping the reaction and recovering said substantially pure dicyclopentadiene.

2 Claims, No Drawings

PROCESS FOR CYCLOPENTADIENE DIMERIZING

The present invention relates to a process for cyclopentadiene dimerizing.

As is well known, cyclopentadiene as such is not easily handled or stocked and in order to facilitate these operations it is desirable to pass by the dimer form even though the dimer must be reconverted into the monomer form before it can be used.

Dimerizing of cyclopentadiene either by spontaneous curing at room temperature, or by heating under pressure in one or more steps is also well known (see French Pat. No. 1 585 205 in the name of Monsanto and U.S. Pat. No. 2 813 135 Johnson)).

In the first case, the reaction is slow (possibly lasting several weeks) and is dangerous because of its exothermicity (possible uncontrolled reaction and pressurizing of the reactor). Consequently, this operation method is difficult to incorporate into a manufacturing process.

In the second case, pressure techniques must be used. The carrying out of the reaction is complicated by the exothermicity of said reaction and pressurizing enhances the formation of adducts having a molecular weight greater than that of the dimer (trimer and tetramer, for example).

The present invention relates then to a dimerizing process which does not present the disadvantages which characterize the prior art processes.

The process for cyclopentadiene dimerizing according to the present invention is essentially characterized in that the reaction is carried out at atmospheric pressure with constant temperature control in such a way that at any given moment (determined by the cyclopentadiene and dicyclopentadiene concentrations of the medium) the liquid phase of said medium is at the threshold of its boiling point.

According to a preferred embodiment of the invention, the reaction is carried out under slight reflux conditions.

According to another preferred embodiment, the starting cyclopentadiene is in a dicyclopentadiene solution.

The process is particularly well suited to the utilization of a cyclopentadiene containing less than 10 percent of other C-5 light hydrocarbons.

As was pointed out above, it is well known that at lower temperatures the cyclopentadiene (CPD) dimerizing rate is slow (13 percent conversion in 1 hour at 40° C.) and moreover, because of the vapor pressure of CPD (Pt Eb, 41° C.) the carrying out of said dimerizing requires the use of pressure at higher temperatures.

We have found that it is possible to reduce the reaction time by operating at atmospheric pressure and under slight reflux conditions, i.e. by following the theoretical distillation curve of the CPD-DCPD (cyclopentadiene-dicyclopentadiene) binary systems.

In fact it has been found that by constantly maintaining the medium under slight reflux conditions, dimerization occurs and the corresponding point on the liquidus curve follows the latter towards the higher temperatures. The reaction then speeds up according to Arrhenius' Law.

In fact we have found that with such a heating law, the conversion level reaches about 70 percent in less than 2 hours (temperature limited to 100° C.) and that this conversion level greatly increases as the temperature rises. Since the reaction is exothermic (about 15 to 20 Kcal/mole) it alone suffices to furnish the calories needed to make the temperature rise.

We have found that the curve obtained by treatment of pure cyclopentadiene under slight reflux conditions is, to be sure, exponential and that in order to obtain a conversion level on the order of 99 percent, it is necessary to apply heat for about 5 hours.

However, this reaction time can be greatly reduced if, for a time $t=0$, the reflux temperature is higher, i.e. if one starts with a CPD-DCPD mixture. Consequently, if 25 percent DCPD is used as the CPD solvent, the reaction time is reduced to 3.33 hours and is further reduced to 1.5 hours when the proportion of DCPD used as the solvent reaches 50 percent.

Now then, this reaction time (about 1 hour), which is close to that used with those techniques in which the reaction is carried out under pressure, is compatible with an industrial process without encountering the disadvantages of these prior art techniques.

We have in fact verified that the interest of the invention lies in the almost total elimination of the polycyclopentadienes and that, even when the temperature reaches 150° C., less than 1 percent of trimer compounds are formed.

The simplicity of the process is another valuable feature of the invention. All that is needed in fact is a simple reactor equipped with a heating coil to initiate the reaction (about 50° to 60° C.) and a cooling agent in order to avoid an uncontrolled reaction.

Self-heating can be easily controlled so that the temperature liquidus curve approximates those curves which have been experimentally determined beforehand. This can be brought about by using a standard temperature programmer controlling the cooling circuit pump.

The process in question is particularly suited for raw materials containing minor proportions of light products other than the CPD. Their vapor pressure would in fact give rise to a vaporization much too great and therefore to an over consumption of the cooling agent.

It is well understood that one can use any apparatus which allows one to constantly control the temperature in such a way that, at any given moment, the liquid phase being treated remains at the threshold of its boiling point. Thus, in addition to the simple reactor equipped with a reflux means, one can use columns such as those used for gas-liquid extractions or distillation columns equipped with trays or packing.

The following examples illustrate the invention and are in no way intended to limit the scope of the invention:

EXAMPLE 1

120 g. of pure cyclopentadiene (CPD) were placed in a 250 ml flask, adapted with a loop, thermometer and a condenser.

The CPD was heated to a low boil (estimated by the droplette flow rate) by means of an external oil bath whose temperature was controlled by a thermostat.

In order to maintain this low boil, the temperature of the oil bath was gradually increased and the temperature of the liquid in the flask was recorded. Heating was stopped when the temperature of the liquid reached 150° to 160° C. At this moment there was practically no more reflux.

Similar runs were carried out in the presence and in the absence of a conventional antioxidant and no notable difference in the result was observed.

EXAMPLE 2

The procedure of Example 1 was followed except that the starting materials were:
a. a mixture of 75 percent CPD and 25 percent DCPD;
b. a mixture of 50 percent CPD and 50 percent DCPD.

As far as the final product was concerned, the results were comparable. However, the advantage of using these mixtures resided in the reduction of the reaction time. In the first case the reaction time was in fact on the order of 3.33 hours and in the second case, on the order of 1.5 hours.

In all cases (Examples 1 and 2) the products were clear and suspension-free; they are crystals (or semi-crystals) at room temperature. There was only slight coloration; only a slight yellow reflection was observed in the case of the samples treated with an antioxidant.

The analysis of the DCPD produced in each of the examples given above is set forth in the following table:

|  | Ex. 1 | Ex. 2a | Ex. 2b |
|---|---|---|---|
| Isoprene | 0.01 % | 0.05 % | 0.01 % |
| CPD + trans-piperylene | 1.0 % | 1.4 % | 0.6 % |
| Cis-piperylene | 0.05 % | 0.05 % | 0.02 % |
| Me - CPD | 0.15 % | 0.05 % | 0.06 % |
| DCPD | 97.0 % | 97.2 % | 97.8 % |
| Codimers | 1.0 % | 0.5 % | 0.60 % |
| Trimers | 0.7 % | 0.70 % | 1.0 % |

EXAMPLE 3

The starting materials for this example were a C–5 hydrocarbon fraction containing 91.7 percent of cyclopentadiene, 2.0 percent of isoprene and piperylene, the balance being comprised of other light C–5 and C–6 hydrocarbons.

893 g. of this C–5 fraction were refluxed by following the procedure of Example 1.

At the end of about 5.5 hours a shoulder was substantially obtained and the temperature no longer continued to rise. This was probably due to the vapor pressure developed by the 8 percent (approx.) of light products.

Upon increasing the temperature to 130° C., 25 g. of light products were distilled and they contained about 6 g. of isoprene, 4 g. of isopiperylene and 3 g. of cyclopentadiene.

The dicyclopentadiene produced was then purified to obtain about 4 percent of heavy residues and a 98 percent pure dicyclopentadiene still containing about 0,5 percent of light products, 0,4 percent of isopropenyl norbornene and 0.9 percent methyl-dicyclopentadiene.

It is obvious that the present invention has been described in a purely illustrative but in no way limitive manner, and that any useful modification may be brought thereto without departing from its scope. However, it should be noted that the process of the invention is equally adaptable to other cyclopentadienes such as, in particular, methyl-cyclopentadiene, in order to obtain the corresponding dimers.

We claim:

1. In a process of thermal dimerizing a concentrated cyclopentadiene monomer feed, the improvement consisting in introducing said feed in a single reactor at atmospheric pressure, heating same to the boiling temperature of said feed, maintaining slight reflux conditions, letting the temperature increase from said boiling temperature to the boiling temperature of substantially pure dicyclopentadiene, stopping the reaction and recovering said substantially pure dicyclopentadiene.

2. In the process of claim 1, adding at least about 25 percent of dicyclopentadiene to said cyclopentadiene monomer feed.

* * * * *

UNITED STATES PATENT OFFICE
CERTIFICATE OF CORRECTION

Patent No. 3,700,741              Dated October 24, 1972

Inventor(s) JEAN AUBRY and EMILE YAX

It is certified that error appears in the above-identified patent and that said Letters Patent are hereby corrected as shown below:

Col. 1, line 73, Assignee: Societe Chimique des Charbonnages line 74: Tour Aurore, Courbevoie, France Signed and sealed this 10th day of April 1973.

(SEAL)
Attest:

EDWARD M.FLETCHER,JR.                ROBERT GOTTSCHALK
Attesting Officer                    Commissioner of Patents